United States Patent Office 2,947,775
Patented Aug. 2, 1960

2,947,775

O,O-DIALKYL S-(2-ACETOXY-2-CYANOETHYL) PHOSPHOROTHIOLOTHIONATES

Harry W. Coover, Jr., and Richard L. McConnell, Kingsport, Tenn., assignors to Eastman Kodak Company, Rochester, N.Y., a corporation of New Jersey No Drawing. Filed Nov. 25, 1957, Ser. No. 698,355

6 Claims. (Cl. 260—461)

This invention relates to new organophosphorus compounds and to their method of preparation. In a specific aspect this invention relates to the preparation of new organophosphorus compounds by the reaction of dialkyl phosphorothiolothionates with acetoxyacrylonitrile and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting dialkyl phosphorothiolothionates with acetoxyacrylonitrile. The new products of this invention have the structural formula:

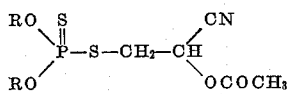

wherein R is a lower alkyl radical containing from 1 to 4 carbon atoms.

The compounds of this invention are formed by reacting a di-lower alkyl phosphorothiolothionate with α-acetoxyacrylonitrile. We prefer to add one of the reactants gradually to a reactor containing the other reactant. For example, the nitrile can be added gradually to a reactor containing the dialkylphosphorothiolothionate. Alternatively however, the reverse procedure of addition of reactants can be used and the dialkylphosphorothiolothionate can be added to a reactor containing the nitrile. Normally it is desirable to employ a reactor provided with adequate means of agitation and, since the reaction is quite exothermic, it is also desirable to employ a reactor that is provided with adequate cooling means.

The operable temperature range for the reaction is generally from −25 to 150° C. and the preferred temperature range is from 25 to 100° C. However, it will be realized that in some instances temperatures outside this range can be employed. The reaction time usually varies from 0.5 to 8 hours, but longer and shorter reaction periods are sometimes used. Normally it is unnecessary to employ a catalyst for the reaction since the dialkylphosphorothiolothionate will react with the nitrile in the absence of a catalyst. If it is considered desirable to employ a catalyst, there are certain catalysts that can be used. For example, the tertiary amines, such as triethyl amine, and the like, can be used.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants, but the ratio of reactants is subject to wide variation.

The dialkylphosphorothiolothionates that are used in our invention can be prepared by the known reaction of 4 moles of an aliphatic alcohol with one mole of phosphorus pentasulfide.

The following examples are illustrative of the compounds within the scope of this invention, their method of preparation and their utility as insecticides.

*Example 1.—O,O-diethyl S-(2-acetoxy-2-cyanoethyl) phosphorothiolothionate*

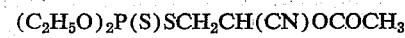

Diethyl phosphorothiolothionate (0.1 mole) was placed in a flask and stirred while α-acetoxyacrylonitrile was added with stirring. Then three drops of triethylamine was added and the temperature began to rise slowly. When the temperature of the reaction mixture had reached 65° C., the flask was cooled externally with cold water. As the reaction temperature began to decrease, the cold water bath was removed. When the temperature had dropped to 25° C., the reaction mixture was heated on the steam bath with stirring for 15 minutes. The product is a reddish brown oil, $n_D^{20}$ 1.5205.

*Example 2.—O,O-dimethyl S-(2-acetoxy-2-cyanoethyl) phosphorothiolothionate*

This compound was prepared from dimethyl phosphorothiolothionate (0.1 mole), α-acetoxyacrylonitrile (0.1 mole), and a catalytic amount of trimethylamine according to the procedure described in Example 1.

*Example 3.—O,O-diisopropyl S-(2-acetoxy-2-cyanoethyl) phosphorothiolothionate*

This compound was prepared from diisopropyl phosphorothiolothionate (0.1 mole), α-acetoxyacrylonitrile (0.1 mole), and a catalytic amount of triethylamine according to the procedure of Example 1.

*Example 4.—O,O-dipropyl S-(2-acetoxy-2-cyanoethyl) phosphorothiolothionate*

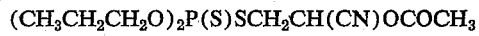

This compound is prepared from dipropyl phosphorothiolothionate (0.1 mole), α-acetoxyacrylonitrile (0.1 mole), and a catalytic amount of triethylamine according to the procedure of Example 1.

*Example 5.—O,O-dibutyl S-(2-acetoxy-2-cyanoethyl) phosphorothiolothionate*

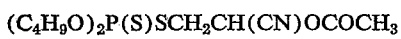

This compound was prepared from dibutyl phosphorothiolothionate (0.1 mole), α-acetoxyacrylonitrile (0.1 mole), and a catalytic amount of tributylamine according to the procedure of Example 1.

*Example 6.—O-ethyl O-methyl S-(2-acetoxy-2-cyanoethyl) phosphorothiolothionate*

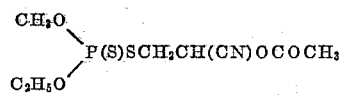

This red oily compound was prepared from O-ethyl O-methyl phosphorothiolothionate (0.1 mole), α-acetoxyacrylonitrile (0.1 mole) and a catalytic amount of triethylamine according to the procedure of Example 1.

*Example 7.—Use of compounds as insecticides*

Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on damp paper toweling in Petri dishes and observed after 24 hours for mortality among the adult mites. Similar tests were conducted on cowpea aphids (*Aphis medicaginis* Koch).

It should be noted that tests using acetone-water solutions (containing none of the toxicant) kill none of the mites or aphids.

| Toxicant | Concentration of Toxicant in p.p.m. | Percent Kill Mites | Percent Kill Aphids |
|---|---|---|---|
| O,O-Diethyl S-(2-acetoxy-2-cyano-ethyl) Phosphorothiolothionate (Example 1) | 100 | 93 | 100 |
| | 30 | 100 | 100 |
| | 10 | 91 | 76 |

The compounds illustrated by Examples 2 through 6 were similarly effective when tested in the above manner.

We claim:

1. O,O-dialkyl S-(2-acetoxy-2-cyanoethyl) phosphorothiolothionates, said alkyl radicals containing from 1 to 4 carbon atoms.
2. O,O-diethyl S-(2-acetoxy-2-cyanoethyl) phosphorothiolothionate.
3. O,O-dimethyl S-(2-acetoxy-2-cyanoethyl) phosphorothiolothionate.
4. O,O-diisopropyl S-(2-acetoxy-2-cyanoethyl)phosphorothiolothionate.
5. O,O-dipropyl S-(2-acetoxy-2-cyanoethyl)phosphorothiolothionate.
6. O-ethyl O-methyl S-(2-acetoxy-2-cyanoethyl)phosphorothiolothionate.

References Cited in the file of this patent

UNITED STATES PATENTS 2,578,652     Cassaday  --------------- Dec. 18, 1951

OTHER REFERENCES

Chem. Abstracts (I), vol. 48, 6639d, 1954.
Chem. Abstracts (II), vol. 48, 556i, 557a, 1954.